United States Patent [19]

Phillips, Jr.

[11] Patent Number: 4,600,353

[45] Date of Patent: Jul. 15, 1986

[54] WRECKER ASSEMBLY

[76] Inventor: Harley E. Phillips, Jr., 924 E. 4th St., Mishawaka, Ind. 46544

[21] Appl. No.: 675,440

[22] Filed: Nov. 27, 1984

[51] Int. Cl.⁴ ............................................. B60P 3/12
[52] U.S. Cl. ................................. 414/563; 280/402
[58] Field of Search ........................ 414/563; 280/402

[56] References Cited

U.S. PATENT DOCUMENTS

| 1,254,804 | 1/1918 | Holmes | 414/563 X |
| 1,641,351 | 9/1927 | Nilson | 414/563 X |
| 1,725,952 | 8/1929 | Beebe | 414/563 |
| 2,541,970 | 2/1951 | Pospisil | 414/563 X |
| 4,186,938 | 2/1980 | Youngblood | 280/402 |

Primary Examiner—Joseph E. Valenza
Assistant Examiner—Stuart J. Millman

[57] ABSTRACT

This wrecker assembly is removably received on a truck body, and is designed to pull at an angle to the right or left, when desired. Primarily, it consists of a bracket mounted boom, which includes a rotatable head at its top, and a projecting pin on the boom is freely received in a horizontal slot in the head. The head further includes a set screw or bolt, for rendering the head secured at the desired angle.

1 Claim, 5 Drawing Figures

WRECKER ASSEMBLY

This invention relates to tow truck devices, and more particularly, to a wrecker assembly.

The principal object of this invention is to provide a wrecker assembly, which will be an improvement over such structures of the prior art.

Another object of this invention is to provide a wrecker assembly, which will be of such design, as to include a boom head, that will tilt left and right approximately thirty degrees, for pulling at an angle.

A further object of this invention is to provide a wrecker assembly, which will be of such design, as to be able to execute the abovementioned, while being safe in use in doing so.

Other objects are to provide a wrecker assembly, which is simple in design, inexpensive to manufacture, rugged in construction, easy to use, and efficient in operation.

These, and other objects, will be readily evident, upon a study of the following specification, and the accompanying drawing, wherein.

Figure 1:
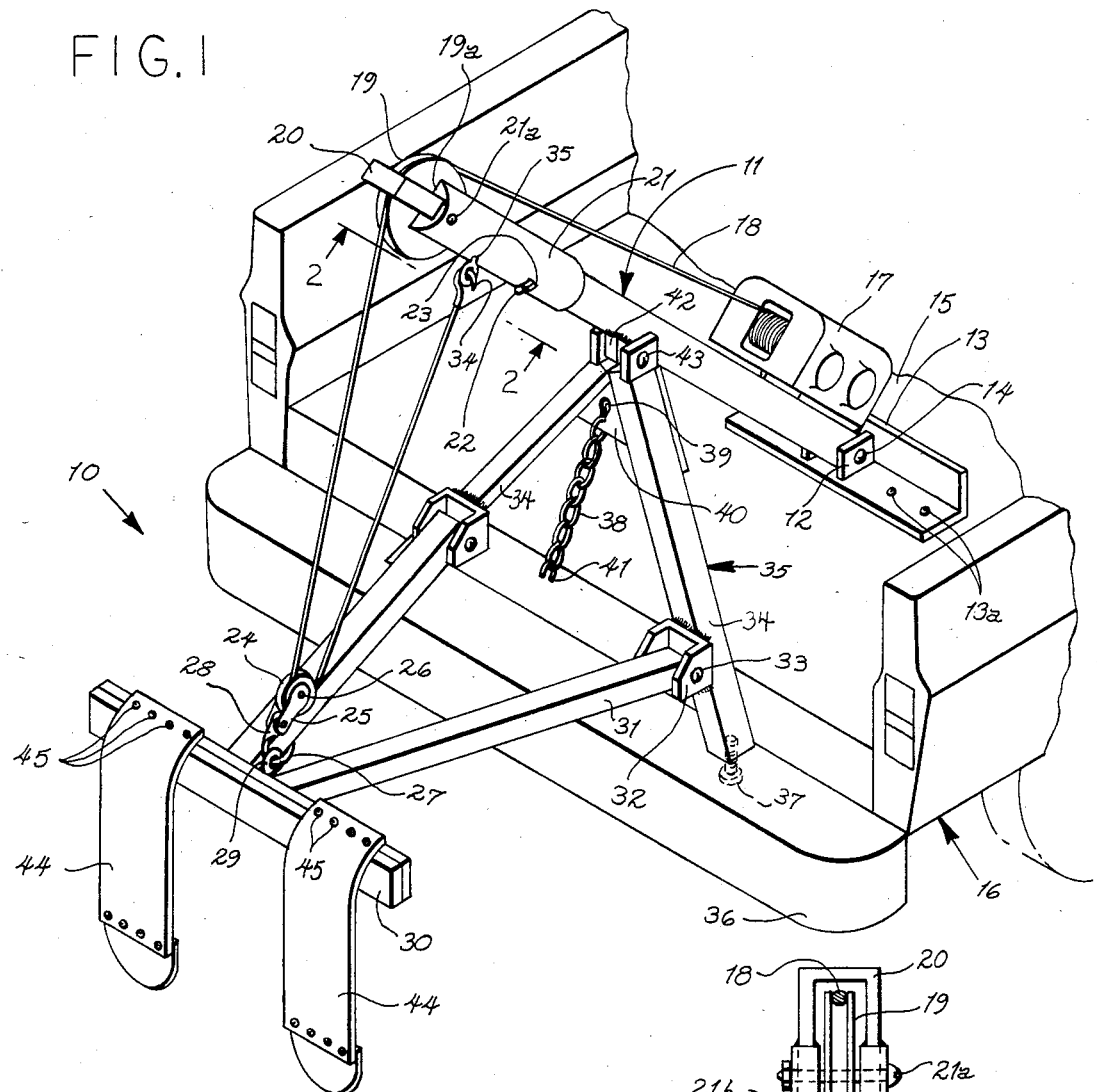
FIG. 1 is a perspective view of the present invention, shown installed on a towing vehicle, which is illustrated fragmentary.
Figure 2:
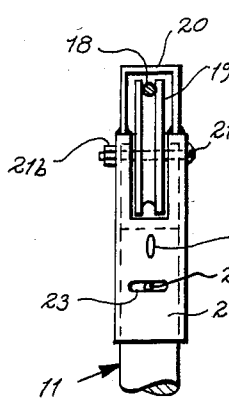
FIG. 2 is a view taken along the line 2—2 of FIG. 1.
Figure 3:
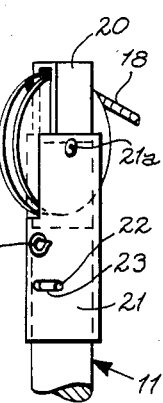
FIG. 3 is similar to FIG. 2, but shown turned to the left.
Figure 4:
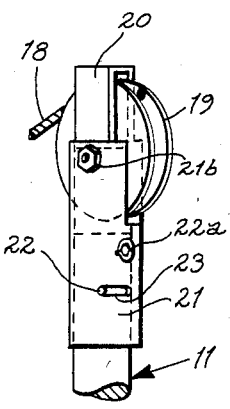
FIG. 4 is also similar to FIG. 2, but illustrates the boom turned to the right.

Accordingly, a wrecker assembly 10 is shown to include a tubular boom 11, which is fixedly secured to a pair of spaced projections 12, suitably fixedly secured to the top of mounting bracket 13, by means of a suitable transverse fastener 14, and bracket 13 is secured to the top surface 15 of tow truck body 16, by suitable fasteners 13a. A six thousand pound electric winch 17 is suitably secured to boom 11 above and adjacent to mounting bracket 13, for the operation of assembly 10, and the cable 18 thereof is received on pulley 19, which is covered by an inverted "U"-shaped member 20, that is fixedly secured, at its ends, in a suitable manner, to the top end of head 21, and pulley 19 is freely received within the opening 19a in the end of head 21. Pulley 19 is pivotally received on a bolt fastener 21, which receives a nut fastener 21b, and head 21 is rotatably received on the upper end of boom 11, so as to pivot left and right approximately thirty degrees. A projecting pin 22 is provided, and is fixedly secured in an opening (not shown) through the upper end of boom 11, and is freely and slideably received in a horizontal slot 23 provided through the head 21, and the combination of pin 22 and the slot 23 cooperate to suspend head 21, and enable head 21 to rotate to a desired angle. A set screw or bolt 22a is also provided in head 21, for rendering head 21 secured in a desired angle against rotation.

Cable 18 is also received on a pulley 24, fastened in a bracket 25 by a pin 26, and a hook 27 is secured to bracket 25 by a suitable fastener 28. Hook 27 is removably received in an eye 29, which is fixedly secured to the center of end bar 30, and a pair of square tubular members 31 are fixedly secured, in a suitable manner, at one end, to bar 30 on each side of eye 29. The opposite ends of members 31 are pivotally secured within a pair of brackets 32, by pins 33, and brackets 32 are welded to the legs 34 of an "A"-frame 35. The bottom ends of legs 34 are fastened to the top of the rear bumper 36 of truck body 16, by bolt fasteners 37, and a chain 38 is suitably secured in opening 39 of the apex portion 40 in the top of "A"-frame 35. The opposite end of chain 38 is suitably secured to an eye 41, which is suitably fixedly secured to the rear portion of truck body 16, and the top of "A"-frame 35 is fastened to a projection 42 by a suitable bolt fastener 43. The projection 42 is welded to the outer periphery of boom 11, and is spaced from the bottom of head 21. The "A"-frame 35 provides support means for boom 11, and a pair of straps 44 are fixedly secured, at one end, to the top of bar 30, by suitable fasteners 45, and serve to hook a vehicle up to wrecker assembly 10.

In operation, the winch 17 is electrically operated by the driver, to lift the vehicle to be towed, after the straps 44 are attached thereto, in the manner known in the art. The winch 17, by its cable 18, lifts or lowers bar 30, by the end of the cable 18 being hooked to the head 21 of assembly 10, and when being operated, the members 31 pivot up or down, as desired. When it is desired to have assembly 10 pull at an angle, the set screw or bolt 22a is loosened, and the head 21 is rotated to the desired angle of pull by the driver, and the screw or bolt 22a is again tightened against the outer periphery of boom 11. It shall also be noted, that the design of assembly 10 is such, that it may be easily removed from the truck body 16, when desired.

Figure 5:
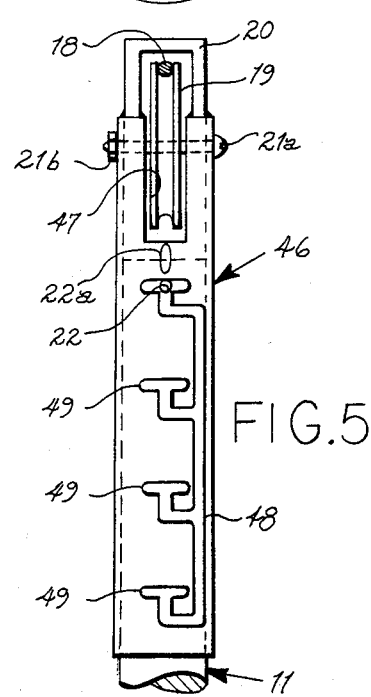
FIG. 5 is also similar to FIG. 2, but illustrates a modified form of the boom of the assembly.

Looking now at FIG. 5, a modified head 46 is shown to include the same aforementioned components 18, 19, 20, 21a, 21b, 22 and 22a. However, pulley 19 is received in the opening 47 at the top of head 46, and an off-set vertical slot 48 is provided through the wall of head 46, which includes a plurality of intersecting "T"-shaped slots 49, that are equally spaced from each other, for selectively receiving the pin 22 of boom 11. This arrangement enables the extending of the boom 11 length, when desired.

In use, the head 46 is rotated to cause pin 22 to travel into the elongated vertical slot 48, and counter rotation of head 46 will enable the operator to enter pin 22 into any one of the "T"-shaped slots 49. The downward weight pressure of the modified head 46 causes the pin 22 to lock in place in the desired slot 29.

While various changes may be made in the detail construction, it is understood that such changes will be within the spirit and scope of the present invention, as is defined by the appended claims.

What I now claim is:

1. A wrecker assembly, comprising, in combination, an automotive towing vehicle, a horizontal flat bed upon the rear of said vehicle, a bracket mounted upon said flat bed having a pair of spaced apart upwardly projections, a lower end of an upwardly rearward inclined boom fixedly secured between said projections, an "A"-frame fastened upon a rear bumper of said vehicle, a chain secured between an upper apex of said "A"-frame and a rear end of said bed, a longitudinally intermediate portion of said boom being fastened upon said "A"-frame apex, a boom head received upon an upper end of said boom, means for limited pivotable rotation of said boom head on said boom and means for extendability thereof on said boom, said both means comprising a pin projecting from the side of said boom being slidable in a slot unit along said boom head, said slot unit comprising a longitudinal slot connected to one end of a plurality of spaced apart transverse slots, and an upwardly "T"-shaped slot on an opposite end of each said transverse slot, said "A"-frame comprising a pair of upwardly converging legs, a rearwardly arm pivotally supported by its one end to a longitudinally intermediate portion of each one of said legs, a transverse cross-bar affixed to opposite end of said arms, a pair of straps affixed on opposite ends of said cross-bar, a winch mounted upon said lower end of said boom, a rotatable pulley around a transverse pin on said boom head, and one end of a cable from said winch extending across said pulley and supporting said cross-bar.

\* \* \* \* \*